R. LOUD.
Refrigerators.

No. 166,469. Patented Aug. 10, 1875.

Witnesses
S. W. Piper
L. N. Böller

Richard Loud,
by his attorney
R. H. Eddy

UNITED STATES PATENT OFFICE.

RICHARD LOUD, OF SOUTH WEYMOUTH, MASSACHUSETTS, ASSIGNOR TO REUBEN LOUD & SON, OF SAME PLACE.

IMPROVEMENT IN REFRIGERATORS.

Specification forming part of Letters Patent No. 166,469, dated August 10, 1875; application filed May 11, 1875.

*To all whom it may concern:*

Be it known that I, RICHARD LOUD, of South Weymouth, of the county of Norfolk and State of Massachusetts, have invented a new and useful Improvement in Refrigerators for Preserving Meats, Vegetables, &c.; and do hereby declare the same to be fully described in the following specification, and represented in the accompanying drawings, of which—

Figure 1:
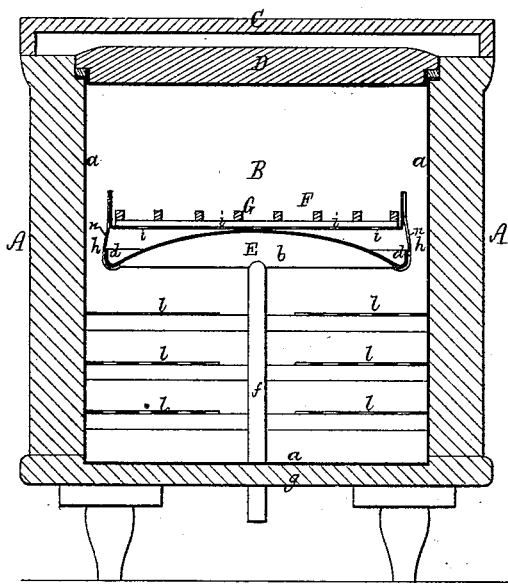
Figure 2:
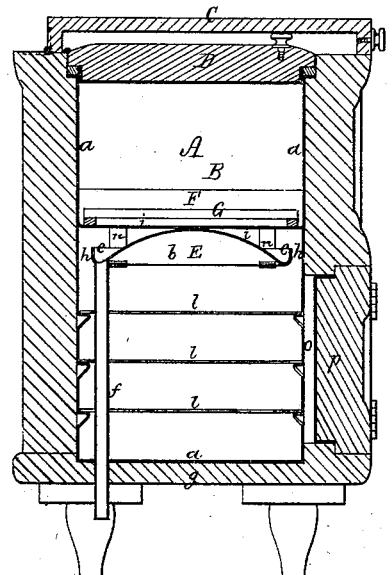

Figure 1 is a longitudinal section, and Fig. 2 a transverse section, of a refrigerator having my invention.

In such drawings the refrigerator is represented as a box, A, lined with metal $a$, and open at top, and there provided with two covers, C D, the upper one being chambered and arranged over the other. It also has an opening, $o$, on its front, provided with a door, $p$. Within the interior or chamber B of the box there is arranged an open pan, E, having a bottom, $b$, concavo-convex, or curved or arched between the sides $cc$, and also between the ends $dd$, all as shown, such pan having a pipe, $f$, leading down from it, and opening out of it and through the bottom $g$ of the box. There is a space, $h$, around the pan E, and between it and the next contiguous surfaces of the box A. Directly over the pan E is another pan, F, somewhat less in length, but having a foraminous bottom, or one provided with numerous small holes, $i$, leading through it. This pan F extends entirely across the chamber B from one side to the opposite thereof, but not from end to end, and within the said pan is a grid or wooden grating, G, to support the blocks of ice. The pans are to be of sheet metal or cast-iron. The space below the domed pan E is to contain the meats or articles to be kept cool, and may be provided with shelves $l\,l$.

It will be seen that the air within the interior of the box A will be cooled by contact with the ice, and will descend through the space $h$ into the space beneath the pan E. Also, that as the ice may become melted, the water passing from it will be received into the pan F, and will escape therefrom through the numerous holes of its bottom, and thereby be diffused over and upon the upper surface of the domed bottom $b$ of the pan E, and, as a consequence, will cool such bottom, so as to cause it to operate to great advantage in cooling the air beneath it. The water, after running down to its base, will find its way into, and down through, the waste-pipe $f$.

The box A may be constructed as such are usually made for refrigerators.

I do not claim in a refrigerator a drip-pan arranged underneath a perforated ice-chamber, and lined with a heat non-conducting substance on its under surface, and provided with a hole for escape of air, all as shown in the United States Patent No. 145,855. In my refrigerator there is no air-inlet to the ice-receptacle, nor any air-outlet to the pan E, independently of its outer discharge-tube $f$, and besides such pan has no heat non-conducting lining on its lower surface, which is expressly designed to cool the air beneath it.

I therefore claim—

In combination with the unperforated box A and the water-diffusing pan F containing the grid G, the pan E, having the domed and cold-conducting bottom, operating as described to cool the air beneath it, all substantially as specified.

RICHARD LOUD.

Witnesses:
 R. H. EDDY,
 J. R. SNOW.